Patented Sept. 28, 1948

2,450,132

UNITED STATES PATENT OFFICE 2,450,132

PREPARATION OF β-LACTONES

Hugh J. Hagemeyer, Jr., Kingsport, Tenn., assignor to Eastman Kodak Company, Rochester, N. Y., a corporation of New Jersey No Drawing. Application July 12, 1947,
Serial No. 760,699

22 Claims. (Cl. 260—344)

This invention relates to a process for preparing lactones of beta-hydroxy, keto-carboxylic acids and bis-beta-hydroxy carboxylic acids, i. e., lactones of such acids as beta-hydroxy-gamma-keto-valeric acid (beta-hydroxy levulinic acid), beta, beta'-dihydroxy-beta, beta'-dimethyl adipic acid and the like.

Staudinger first showed that keto-ketenes, such as diphenyl ketene, react with aldehydes and ketones to give lactones (Annalen 384, 1911, pages 38 to 135, and Annalen 380, 1911, page 243), and with unsaturated ketones to give unsaturated hydrocarbons (Annalen 401, 1913, page 263). It has long been known that aldoketenes, such as methyl ketene, readily polymerize to the dimer under ordinary conditions of temperature and pressure. Boese in U. S. Patent No. 2,108,427, dated February 15, 1939, shows that ketene dimers react with aldehydes to produce unsaturated ketones. The process of my invention, however, is applicable both to aldo- and keto-ketenes although ketene itself is usually preferred.

Kung in U. S. Patent No. 2,356,459, dated August 22, 1944, shows the reaction between ketenes and aldehydes and ketones to produce beta-lactones, a catalyst of the Friedel-Crafts type being employed. It has now been found that ketenes react with di-ketones in the presence of Friedel-Crafts type catalysts, as well as their organic complexes such as etherates, etc., to produce the beta-lactones of my invention.

An object of my invention is to provide a process for preparing lactones of keto, beta-hydroxy carboxylic acids and beta, beta'-dihydroxy-dicarboxylic acids.

Other objects will become apparent from a consideration of the following examples.

Accordingly, my new beta lactones are prepared by passing a ketene into a solution containing the diketone and a Friedel-Crafts type catalyst. If only one molecular equivalent of the ketene is reacted with the diketone, the lactone of a keto, beta-hydroxy carboxylic acid is produced. When a second molecular equivalent of the ketene reacts with the lactone of the keto-beta-hydroxy carboxylic acid, the lactone of a beta, beta'-dihydroxy, dicarboxylic acid is produced. Generally under ordinary conditions of operation a mixture results consisting of the lactone of the keto-beta-hydroxy carboxylic acid and the lactone of the beta, beta'-dihydroxy dicarboxylic acid. These reactions may be illustrated by the following equations:

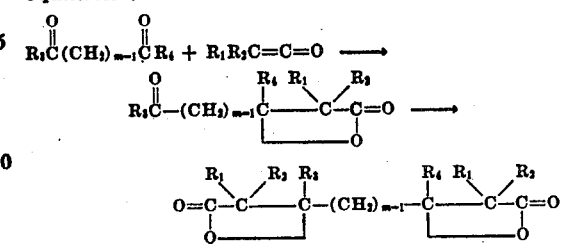

wherein $R_1$ and $R_2$ each represent hydrogen; an alkyl group such as methyl, ethyl, propyl, isopropyl, butyl, isobutyl, secondary and tertiary butyl, i. e., an alkyl group having the formula $C_nH_{2n+1}$ where $n$ is a positive integer from 1 to 4; an aryl group such as phenyl, o-, m-, and p-tolyl, i. e., an aryl group of the benzene series having 6 to 10 carbon atoms; and an aralkyl group such as benzyl, alpha and beta phenyl ethyl; $R_3$ and $R_4$ each represent an alkyl group such as methyl, ethyl, propyl, isopropyl, butyl, isobutyl, secondary and tertiary butyl, i. e., an alkyl group of the formula $C_nH_{2n+1}$ where $n$ is a positive integer of 1 to 4 or an aryl group such as phenyl, o-, m-, and p-tolyl, i. e., an aryl group of the benzene series having 6 to 10 carbon atoms; and $m$ is a positive integer from 1 to 3.

The ketenes which may be employed in my process are represented by the formula:

wherein $R_1$ and $R_2$ have the above designated definitions. I prefer to use ketenes where $R_1$ and $R_2$ represent hydrogen or a methyl radical, i. e., ketene or dimethyl ketene.

Diketones which may be employed have the formula:

where $R_3$ and $R_4$, and $m$ have the definitions designated above. Typical diketones which may be used are diacetyl, acetyl acetone, propionyl acetone, butyryl acetone, valeryl acetone, acetonyl acetone, dibenzoyl, dibenzoyl methane, dibenzoyl ethane, and the like.

The conditions under which the ketene and diketone react may be varied according to the type of compounds used. Due to the inherent nature of ketenes to polymerize with ease, it is usually preferred to use conditions which are mild. The temperature may vary from as low as —70° C. to as high as +50° C. depending on the nature of the reactants, type of catalyst, and the absence or presence of a solvent. Generally a temperature of from about —10° C. to 25° C. is preferred.

The catalyst employed is of the Friedel-Crafts type. For example, the halides of boron, aluminum, zinc, iron, titanium, tin, and the like may be used. The amount of catalyst may vary from about 0.01% to 2% by weight based on the amount of diketone employed. Generally it is more practical to use amounts varying from about 0.1% to 0.5% by weight based on the amount of the diketone. Boron trifluoride in the form of its etherate is the preferred catalyst since it permits a lower temperature to be employed, thus eliminating the possibility of polymerization.

Solvents may or may not be used in my process, depending on the diketone with which the ketene is condensed. Solvents which may be used are benzene, toluene, xylene, heptane, dioxane, diethyl ether, isopropyl ether, carbon tetrachloride, carbon disulphide, ethylene dichloride, and the like. If desired, a solution of lactone produced from a previous run may be employed as solvent, thus obviating the necessity of removing a solvent from the neutralized reaction mixture. The lactone used as a solvent need not correspond to the lactone formed, if such lactones may be separated by flash fractional distillation under reduced pressures as is hereinafter described, or if the lactone mixture is to be used in the preparation of synthetic resins, plastics, etc.

My process may be batch-wise or continuous, and if ketene has been produced by the pyrolysis of acetic acid, it may be advantageous to carry out my reaction in a scrubber-type reactor. Such a process is described in the co-pending application of Herbert G. Stone, Serial Number 660,285, dated April 6, 1946. When a continuous process is to be used, any of the apparatus provided for such condensation-type reactions may be employed. The reaction chamber may or may not be packed with an inert packing such as Berl saddles, Raschig rings, etc. The flow of reactants may be concurrent or counter-current, the lactone formed being drawn off as needed. When a continuous process is to be employed, I prefer to utilize the apparatus described in the copending application of Hugh J. Hagemeyer and Delmer C. Cooper, Serial Number 660,286, filed April 6, 1946.

After neutralization of the crude reaction mixture, the resulting solution is filtered, and a mixture consisting primarily of the reaction products of 1 mol of ketene with 1 mol of diketone and 2 mols of ketene with 1 mol of diketone remains.

If desired the lactone mixture which results may be distilled into a flash fractionating column under high vacuum, and there separated into its component parts. Since such a step requires such careful temperature control, it is usually preferred to use the mixture of lactones in the preparation of other compounds which may be separated more easily. For example, the mixture of lactones may be distilled under atmospheric pressure to induce decarboxylation of the lactones, a mixture of an olefinic ketone and a diolefin being obtained according to the equations:

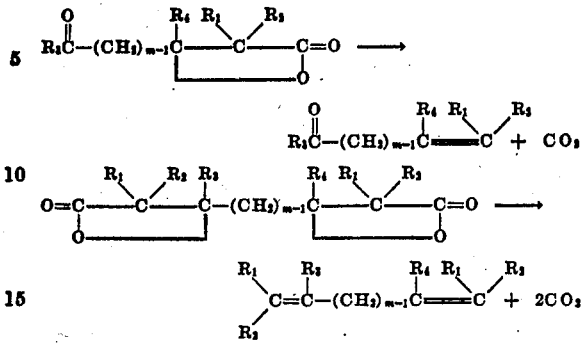

The diolefin and olefinic ketone thus produced may then be separated easily by fractional distillation under reduced pressure, a polymerization inhibitor such as hydroquinone or beta-naphthol being used if desired.

Further possible uses for my lactone mixtures include hydrolyzing the mixture to the corresponding beta-hydroxy carboxylic acids in the presence of an acid catalyst, separating the mixture, or subsequently dehydrating the hydroxy carboxylic acids to their corresponding unsaturated derivatives. This mixture of acids may then be separated by distillation in a fractionating column under reduced pressures, etc. Also it is possible to treat my mixture of lactones with an alcohol to produce a mixture of alkoxy acids, which may be separated easily by fractional distillation under a high vacuum. My lactone mixture is also suitable for preparing unsaturated amides or nitriles.

The following examples are given to further characterize my invention.

*Example I.—Reaction of ketene with acetonyl acetone*

Ketene, obtained by the pyrolysis of acetone or acetic acid, is led into a stirred solution of 300 gm. (2.65 mols) of acetonyl acetone and 4 cc. of boron trifluoride etherate, the temperature being maintained at 0° C. by means of an ice bath. The addition of ketene is continued until a total of 3 moles has been added, and the catalyst is neutralized with an excess of sodium bicarbonate dissolved in several ccs. of water. The solution was then filtered, and a mixture consisting primarily of the monolactone:

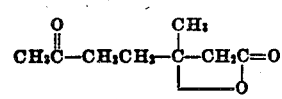

and the dilactone:

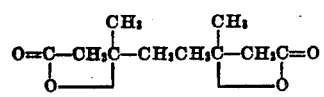

is obtained. Some of the acetonyl acetone had cyclicized to 2,5-methyl, furan and in order to obtain a pure lactone mixture the solution was passed into a chamber maintained at an elevated temperature under reduced pressure and equipped with a fractionating column. To further identify the lactone mixture, the solution is heated under atmospheric pressure at a temperature of 108° C. a vigorous evolution of $CO_2$ taking place. The residue was fractionated and diisobutenyl (2,5-dimethyl-1,5-hexadiene) B. P. 112° C., $N_D^{20}$ 1.4348, $$D_{20}^{20} 0.8646$$

having the formula

and 2-methyl hexene-1-one 5 B. P. 154° C. at 734 mm. $N_D^{20}$ 1.4348, $$D_{20}^{20} 0.8646$$

having the formula

were obtained.

*Example 2.—Reaction of ketene with diacetyl*

84 gms. of diacetyl are diluted to 250 ml. with isopropyl ether, and the resulting solution was cooled to 0° C. Boron trifluoride etherate (2 cc.) catalyst is then added, a rapid stream of ketene, obtained by the pyrolysis of acetone, is passed into the stirred solution through a hollow high speed stirrer. Ketene is passed into the solution until a total of 2.5–3.0 mols had been added. The catalyst is then neutralized by addition of an excess of sodium carbonate, and the resulting solution filtered. A solution consisting primarily of the mono-lactone:

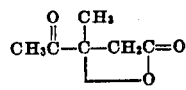

and the dilactone:

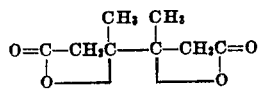

is obtained. This mixture is then purified by flash fractional distillation under reduced pressure. In order to identify the lactones formed, the mixture was subjected to decarboxylation at atmospheric pressure, and the residue or distillate subjected to fractional distillation. Twelve grams (12) of methyl isopropenyl ketone B. P. 95–98° C. under 735 mm. having the formula:

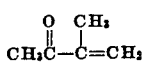

and 2,3-dimethyl butadiene-1,3 (4 grams) B. P. 68° C. under 735 mm. pressure and having the formula

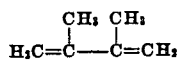

are obtained.

*Example 3.—Reaction of ketene with acetyl acetone*

Boron trifluoride etherate (4 cc.) is dissolved in 300 cc. of acetyl acetone. Ketene is then passed into the stirred solution which is maintained at a temperature of 0° C. by cooling. Ketene is passed in continuously until a total of 4–5 mols has been added. The catalyst was then neutralized by addition of an excess of sodium bicarbonate dissolved in several ccs. of water, and the solution filtered. The excess or unreacted acetyl acetone was removed by flash distillation in a fractionating column maintained under reduced pressure, and a mixture of the mono lactone:

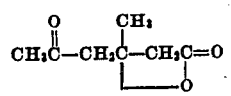

and the dilactone:

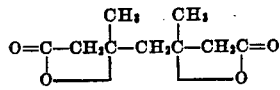

is obtained. In order to identify these lactones, the mixture is distilled under atmospheric pressure at a temperature of 90–110° C., a vigorous evolution of $CO_2$ taking place. In order to completely decarboxylate any lactone, the mixture is distilled under total reflux for one hour, at the end of which time the mixture is fractionally distilled, 22 gms. of diisopropenyl methane B. P. 88° C. at 735 mm. $N_D^{20}$ 1.4399

$$D_{20}^{20} 0.7397$$

having the formula:

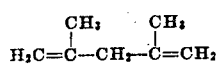

and 47 grams of 2-methyl penten-1-one-4, B. P. 127° under 735 mm., $N_D^{20}$ 1.4412

$$D_{20}^{20} 0.857$$

having the formula:

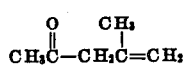

are obtained.

*Example 4.—Reaction of ketene with dibenzoyl methane*

112 grams of dibenzoyl methane are dissolved in a 0.5% solution of boron trifluoride etherate in one liter of diisopropyl ether. The solution is cooled to 10–20° C. and a half mol of ketene is passed in through a high speed stirrer. Solid anhydrous sodium acetate is added to neutralize the catalyst and the solution is filtered. The solvent is removed at reduced pressure leaving a mixture of dibenzoyl methane and the corresponding mono- and di-lactones. Decarboxylation was accomplished by heating the residue at 110–150° C. 14.7 liters of $CO_2$ were evolved which indicates a conversion of 65 per cent based on the ketene.

Similarly when dibenzoyl is reacted with ketene a mixture of lactones having the formulae:

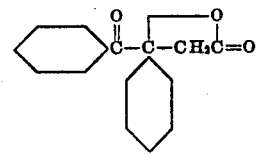

and

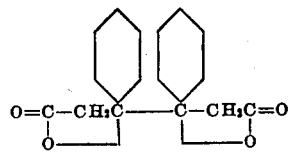

is obtained. When 1,2 dibenzoyl ethane is reacted with ketene a mixture of lactones having the formulae:

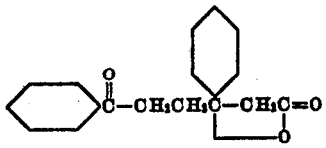

and

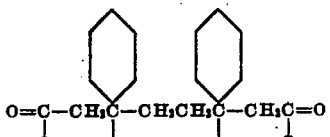

is obtained.

What I claim as my invention and desire to be protected by Letters Patent of the United States is:

1. A process for preparing beta-lactones which comprises reacting at a temperature of —70° C. to 50° C. a ketene having the formula:

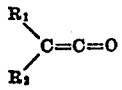

wherein $R_1$ and $R_2$ each represents a member selected from the group consisting of a hydrogen atom, a methyl group, an ethyl group, and a phenyl ($C_6H_5$—) group, with a diketone having the formula:

wherein $R_3$ and $R_4$ each represents a member selected from the group consisting of alkyl groups of the formula $C_nH_{2n+1}$ wherein $n$ is a positive integer from 1 to 4, and a phenyl ($C_6H_5$—) group, and $m$ is a positive integer from 1 to 3, in the presence of a Friedel-Crafts catalyst.

2. A process for preparing beta-lactones which comprises reacting at a temperature of —70° C. to 50° C. a ketene having the formula:

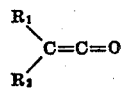

wherein $R_1$ and $R_2$ each represents a member selected from the group consisting of a hydrogen atom, a methyl group, an ethyl group, and a phenyl ($C_6H_5$—) group, with a diketone having the formula:

wherein $R_3$ and $R_4$ each represents a member selected from the group consisting of alkyl groups of the formula $C_nH_{2n+1}$ wherein $n$ is a positive integer from 1 to 4, and a phenyl ($C_6H_5$—) group, and $m$ is a positive integer from 1 to 3, in the presence of a Friedel-Crafts catalyst, and in the presence of an inert solvent.

3. A process for preparing beta-lactones which comprises reacting at a temperature of —70° C. to 50° C. a ketene having the formula:

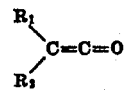

wherein $R_1$ and $R_2$ each represents a member selected from the group consisting of a hydrogen atom, a methyl group, an ethyl group, and a phenyl ($C_6H_5$—) group, with a diketone having the formula:

wherein $R_3$ and $R_4$ each represents a member selected from the group consisting of alkyl groups of the formula $C_nH_{2n+1}$ wherein $n$ is a positive integer from 1 to 4, and a phenyl ($C_6H_5$—) group, and $m$ is a positive integer from 1 to 3, in the presence of from 0.01% to 2% by weight, based on the diketone, of a Friedel-Crafts catalyst.

4. A process for preparing beta-lactones which comprises reacting, at a temperature of —70° C. to 50° C., ketene ($CH_2$=C=O) with a diketone having the formula:

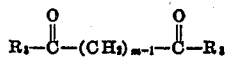

wherein $R_3$ and $R_4$ each represents a member selected from the group consisting of alkyl groups of the formula $C_nH_{2n+1}$ wherein $n$ is a positive integer from 1 to 4, and a phenyl ($C_6H_5$—) group, and $m$ is a positive integer from 1 to 3, in the presence of a Friedel-Crafts catalyst.

5. A process for preparing beta-lactones which comprises reacting, at a temperature of —70° C. to 50° C., ketene ($CH_2$=C=O) with a diketone having the formula:

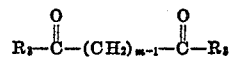

wherein $R_3$ and $R_4$ each represents a member selected from the group consisting of alkyl groups of the formula $C_nH_{2n+1}$ wherein $n$ is a positive integer from 1 to 4, and a phenyl ($C_6H_5$—) group, and $m$ is a positive integer from 1 to 3, in the presence of from 0.01% to 2% by weight, based on the diketone, of a Friedel-Crafts catalyst.

6. A process for preparing beta-lactones which comprises reacting at a temperature of —70° C. to 50° C. a ketene having the formula:

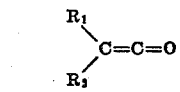

wherein $R_1$ and $R_2$ each represents a member selected from the group consisting of a hydrogen atom, a methyl group, an ethyl group, and a phenyl ($C_6H_5$—) group, with a diketone having the formula:

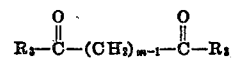

wherein $R_3$ and $R_4$ each represents an alkyl group of the formula $C_nH_{2n+1}$ wherein $n$ is a positive integer from 1 to 4, and $m$ is a positive integer from 1 to 3, in the presence of a Friedel-Crafts catalyst.

7. A process for preparing beta-lactones which comprises reacting at a temperature of —70° C. to 50° C. a ketene having the formula

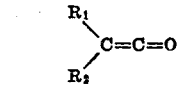

wherein $R_1$ and $R_2$ each represents a member selected from the group consisting of a hydrogen atom, a methyl group, an ethyl group, and a phenyl ($C_6H_5$—) group, with a diketone having the formula:

wherein $R_3$ and $R_4$ each represents an alkyl group of the formula $C_nH_{2n+1}$ wherein $n$ is a positive integer from 1 to 4, and $m$ is a positive integer from 1 to 3, in the presence of from 0.01% to 2% by weight, based on the diketone, of a Friedel-Crafts catalyst.

8. A process for preparing beta-lactones which comprises reacting at a temperature of —70° C. to 50° C. a ketene having the formula:

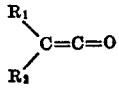

wherein $R_1$ and $R_2$ each represents a member selected from the group consisting of a hydrogen atom, a methyl group, an ethyl group, and a phenyl ($C_6H_5$—) group, with a diketone having the formula:

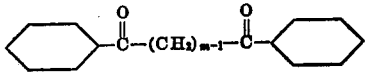

wherein $m$ represents an integer from 1 to 3, in the presence of a Friedel-Crafts catalyst.

9. A process for preparing beta-lactones which comprises reacting at a temperature of —70° C. to 50° C. a ketene having the formula:

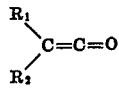

wherein $R_1$ and $R_2$ each represents a member selected from the group consisting of a hydrogen atom, a methyl group, an ethyl group, and a phenyl ($C_6H_5$—) group, with a diketone having the formula:

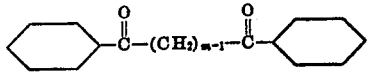

wherein $m$ represents an integer from 1 to 3, in the presence of from 0.01% to 2% by weight, based on the diketone, of a Friedel-Crafts catalyst.

10. A process for preparing beta-lactones which comprises reacting, at a temperature of —70° C. to 50° C., ketene ($CH_2=C=O$) with a diketone having the formula:

wherein $R_3$ and $R_4$ each represents an alkyl group of the formula $C_nH_{2n+1}$ wherein $n$ is a positive integer from 1 to 4, and $m$ is a positive integer from 1 to 3, in the presence of a Friedel-Crafts catalyst.

11. A process for preparing beta-lactones which comprises reacting, at a temperature of —70° C. to 50° C., ketene ($CH_2=C=O$) with a diketone having the formula:

wherein $R_3$ and $R_4$ each represents an alkyl group of the formula $C_nH_{2n+1}$ wherein $n$ is a positive integer from 1 to 4, and $m$ is a positive integer from 1 to 3, in the presence of from 0.01% to 2% by weight, based on the diketone, of a Friedel-Crafts catalyst.

12. A process for preparing beta-lactones which comprises reacting, at a temperature of —70° C. to 50° C., ketene ($CH_2=C=O$) with a diketone having the formula:

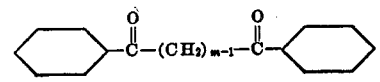

wherein $m$ represents an integer from 1 to 3, in the presence of a Friedel-Crafts catalyst.

13. A process for preparing beta-lactones which comprises reacting, at a temperature of —70° C. to 50° C., ketene ($CH_2=C=O$) with a diketone having the formula:

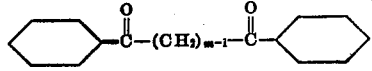

wherein $m$ represents an integer from 1 to 3, in the presence of from 0.01% to 2% by weight, based on the diketone, in the presence of a Friedel-Crafts catalyst.

14. A process for preparing a mixture of a mono-lactone having the formula:

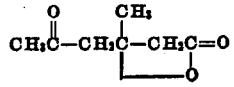

and a dilactone having the formula:

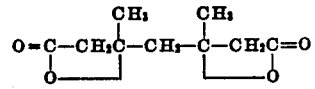

which comprises reacting at a temperature from —70° C. to +50° C. gaseous ketene with a solution containing a Friedel-Crafts catalyst dissolved in acetyl acetone.

15. A process according to claim 14 wherein 0.1% to 0.5% by weight of catalyst based on the acetyl acetone is used and a temperature of —10° C. to 25° C. is maintained.

16. A process for making a mixture of a mono-lactone having the formula:

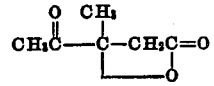

and a dilactone having the formula:

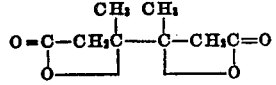

which comprises reacting at a temperature from —70° C. to +50° C. gaseous ketene with a solution containing a Friedel-Crafts catalyst dissolved in diacetyl.

17. A process according to claim 16 wherein an amount of catalyst from 0.1% to 0.5% by weight based on the diacetyl is used at a temperature from —10° C. to 25° C.

18. A process for preparing a mixture of a beta-lactone having the formula:

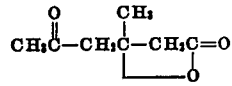

and a dilactone having the formula:

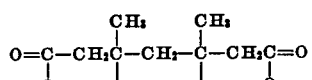

which comprises passing gaseous ketene into a vigorously stirred solution of 0.1% to 0.5% by weight based on the acetyl acetone of boron fluoride etherate dissolved in said acetyl acetone, continuing the passage of ketene into the solution until substantially all the acetyl acetone has reacted while maintaining the temperature from —70° C. to +50° C., neutralizing the catalyst with a weak alkaline solution, and thereafter separating the mixture of lactones from the unreacted residue.

19. A process for preparing a mixture of a mono lactone having the formula:

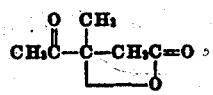

and a dilactone having the formula:

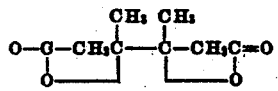

which comprises passing ketene into a vigorously stirred solution containing diacetyl in which has been dissolved 0.1% to 0.5% by weight based on the diacetyl of boron fluoride etherate, continuing passage of the ketene into the solution until substantially all the diacetyl has reacted while maintaining the temperature from −70° C. to +50° C., thereafter neutralizing the catalyst with a solution of a weak alkali, and separating the lactone mixture from the residue.

20. A process for preparing a mixture of a mono-lactone having the formula:

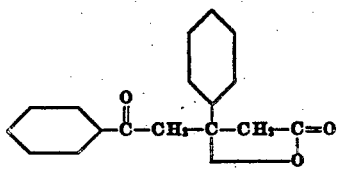

and a dilactone having the formula:

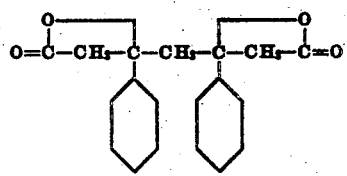

which comprises reacting at a temperature of −70° C. to 50° C. gaseous ketene with a solution containing a Friedel-Crafts catalyst dissolved in dibenzoyl methane.

21. A process according to claim 20 wherein 0.1% to 0.5% by weight of catalyst, based on the dibenzoyl methane is used and a temperature of −10° C. to 25° C. is maintained.

22. A process for preparing a mixture of monolactone having the formula:

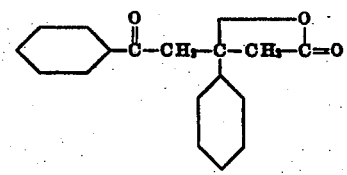

and a dilactone having the formula:

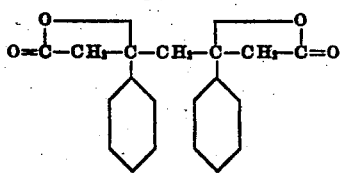

which comprises passing gaseous ketene into a vigorously stirred solution of dibenzoyl methane having dissolved therein from 0.1% to 0.5% by weight, based on the dibenzoyl methane, of boron trifluoride etherate, continuing the passage of the ketene into the solution until substantially all the dibenzoyl methane has reacted while maintaining the temperature at from −70° C. to +50° C., thereafter neutralizing the catalyst with a solution of a weak alkali, and separating the lactone mixture from the residue.

HUGH J. HAGEMEYER, Jr.

REFERENCES CITED

The following references are of record in the file of this patent:

UNITED STATES PATENTS

| Number | Name | Date |
| --- | --- | --- |
| 2,356,459 | Kung | Aug. 22, 1944 |